United States Patent [19]
Johnson, Jr. et al.

[11] 3,759,168
[45] Sept. 18, 1973

[54] FRUIT SLICER

[75] Inventors: Maurice V. Johnson, Jr., Upland;
Ned C. Carter, Chino; Kenneth W. Koenig; Frederick W. Riddington, both of Ontario; John M. Ross, Upland; Ronald T. Smith, Ontario, all of Calif.

[73] Assignee: Sunkist Growers, Inc., Sherman Oaks, Calif.

[22] Filed: June 17, 1971

[21] Appl. No.: 154,024

[52] U.S. Cl. .................................. 99/545, 99/590
[51] Int. Cl. .................................... A23n 15/00
[58] Field of Search ............... 146/3 R, 3 A, 40, 146/52, 155, 6; 99/545, 590

[56] References Cited
UNITED STATES PATENTS
2,437,637  3/1948  Bridge .................................. 146/40
3,620,274  11/1971  Anderson ............................ 146/52

Primary Examiner—Willie G. Abercrombie
Attorney—Paul A. Weilein

[57] ABSTRACT

Slices of citrus fruit with peripheral portions of skin are conveyed through a succession of stations, including a station where a reciprocating circular knife severs central portions of the slices from surrounding ring-shaped portions of the slices. At a subsequent station the central fruit portions are bisected. At later stations the bisected fruit portions are discharged and the ring-shaped fruit portions are discarded.

30 Claims, 17 Drawing Figures

FRUIT SLICER

BACKGROUND OF THE INVENTION

Sliced oranges free from skin are commonly used by restaurants for fruit desserts and to garnish various servings of food. It is not economical, however, to have the personnel of a restaurant take time to slice fresh fruit for this purpose. There is a definite need, therefore, for power actuated automatic apparatus to sever fruit slices free from skin at a high production rate for delivery to restaurants.

SUMMARY OF THE INVENTION

The basic object of the invention is to meet the above mentioned need for mass production of slices of citrus fruit with the slices free from skin. For this purpose, citrus fruit are sliced transversely of their axes to produce a supply of fruit slices having peripheral portions of skin and these fruit slices are processed rapidly by an apparatus which includes a conveyor to move the fruit slices step by step through a sequence of stations. At a first station a reciprocating circular knife severs central circular sections of the fruit slices from surrounding ring-shaped fruit sections that include peripheral skin. At a second station the central fruit portions are bisected. The bisected central fruit portions are collected at a later station and finally the ring-shaped fruit portions with the skin thereon are discarded.

To carry out this operating cycle automatically, an endless conveyor chain having an upper run and a lower run carries a row of spaced holders for the individual fruit slices and a pneumatic power cylinder intermittently engages and advances the chain to advance the holders from station to station. A second pneumatic power cylinder reciprocates both the circular knife at the first cutting station and a straight blade at the bisecting station. In addition, the second pneumatic power cylinder reciprocates indexing means that serves to position the series of holders accurately at the various stations. Ejector means for freeing the newly severed central fruit sections from the circular knife is operated by the reciprocation of the circular knife itself.

Each of the holders on which the successive fruit slices are transported comprises an inner support for the central fruit sections and a surrounding annular support for the outer ring-shaped fruit sections. After the central fruit sections are severed and bisected, the inner supports on which they rest swing downward to release the bisected central fruit sections at a discharge station. Subsequently, the outer supports that carry the outer ring-shaped fruit sections make a transition from the upper run of the conveyor to the lower run and in doing so turn upside down to discard the ring-shaped fruit sections.

A pneumatic control system for automatic operation of the apparatus includes a first spool-type four-way valve to control the power cylinder that intermittently advances the conveyor chain and further includes a second similar four-way valve to control the second pneumatic power cylinder that reciprocates both the circular knife and the bisecting blade. In effect, these two four-way valves trigger each other alternately for continuous repetition of the operating cycle.

The features and advantages of the invention may be understood from the following detailed description and the accompanying drawings.

BRIEF DESCRIPTION OF THE DRAWINGS

In the drawings, which are to be regarded as merely illustrative.

DESCRIPTION OF THE PREFERRED EMBODIMENT OF THE INVENTION

Figure 1:
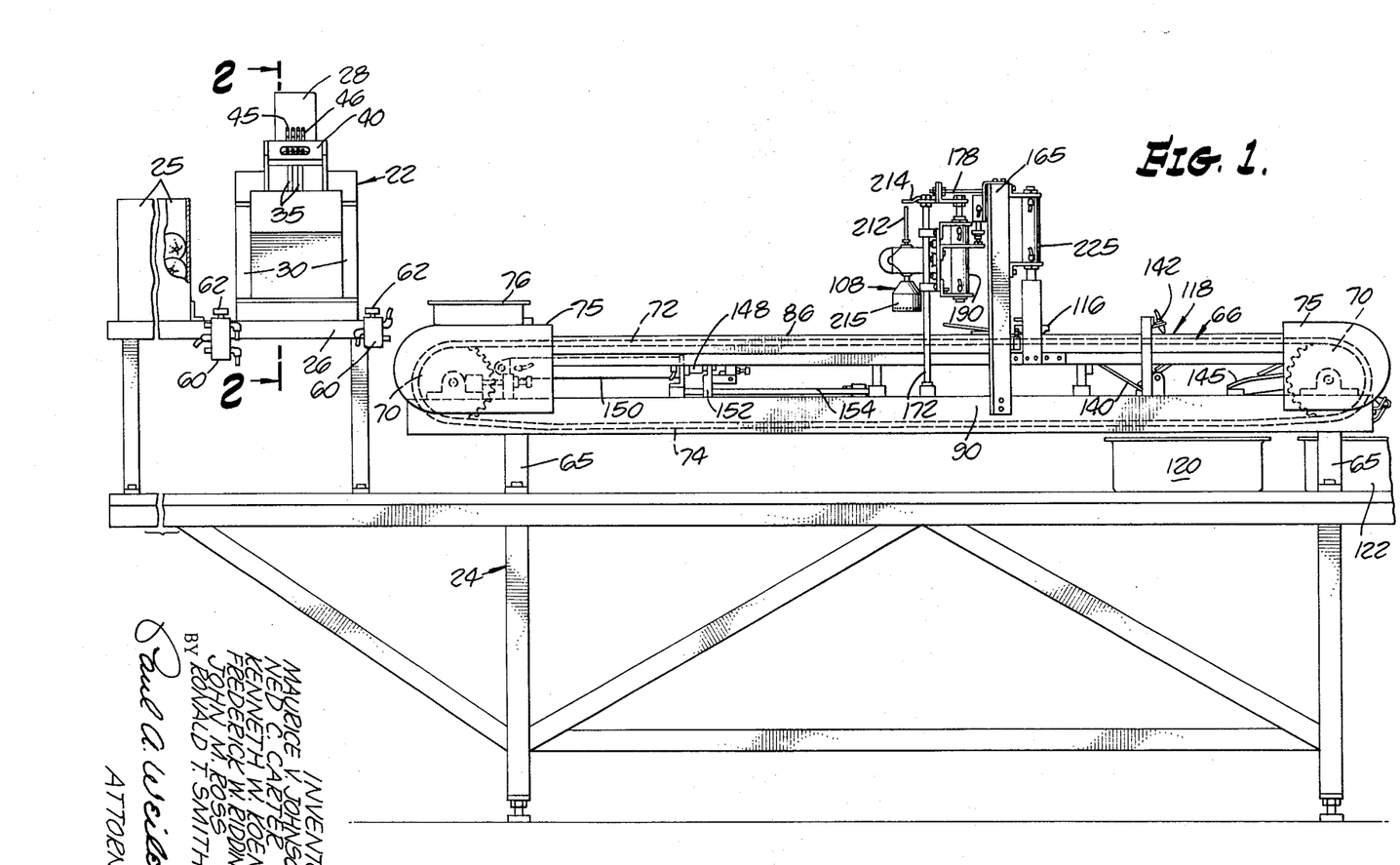
FIG. 1 is a side elevational view of the presently preferred embodiment of the apparatus.

Referring first to FIG. 1, the selected embodiment of the invention processes orange slices that have peripheral skin portions. In this instance, the fruit is sliced in advance by a slicing machine generally designated 22, the slicing machine and the apparatus for processing the slices being mounted on a common framework generally designated 24.

The oranges that are to be sliced by the slicing machine 22 are made available to the operator by a supply bin 25 which may be continually replenished by a suitable supply hopper (not shown).

Figures 2, 3:
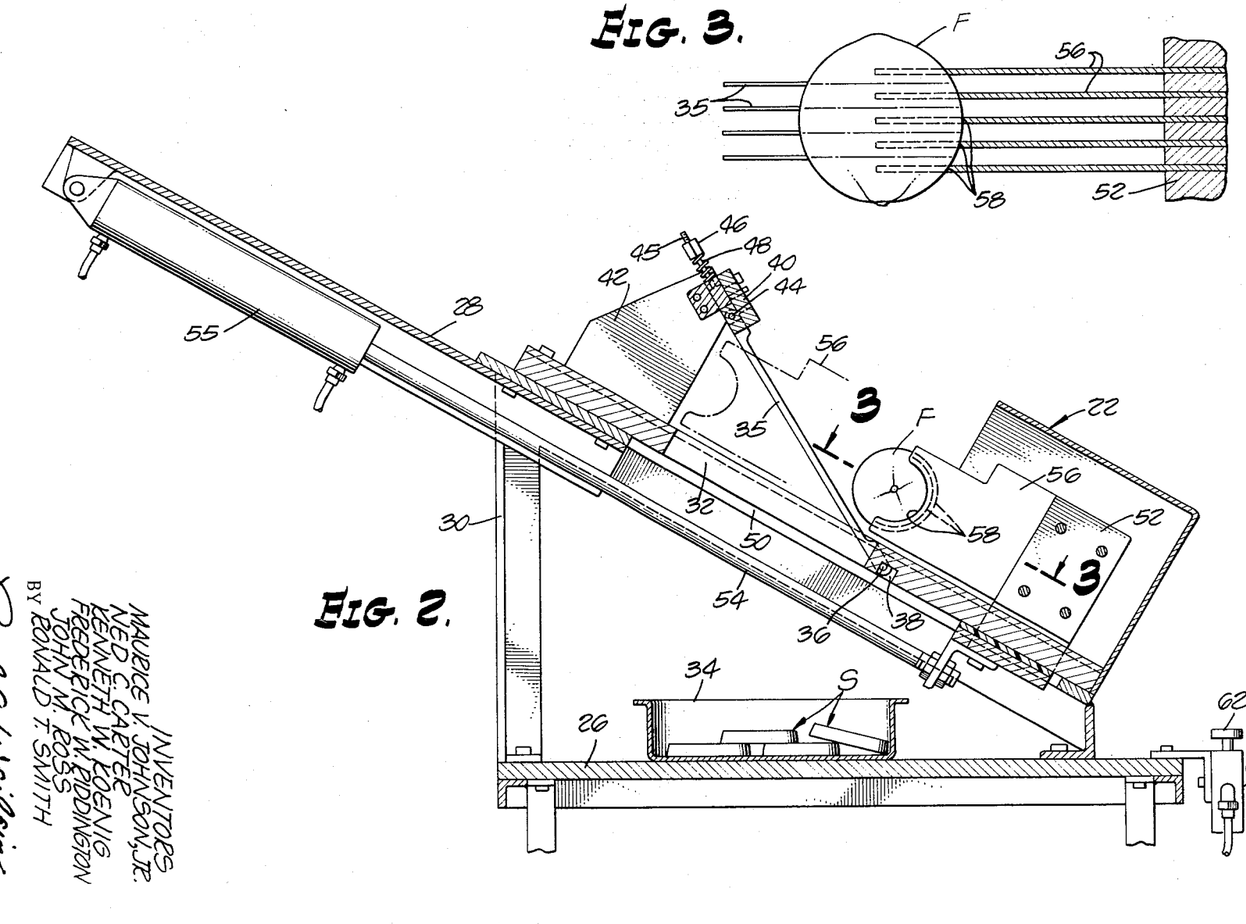
FIG. 2 is an enlarged section of an auxiliary fruit slicer taken as indicated on line 2—2 of FIG. 1.
FIG. 3 is an enlarged section taken as indicated on line 3—3 of FIG. 2.

Referring to FIGS. 2 and 3, the structure of the slicing machine 22 includes a platform 26 and an inclined support 28 which is anchored to the platform at its lower end and which is supported at its upper end by a pair of legs 30. The inclined support 28 has an opening 32 through which the fruit slices may fall into a receptacle 34 on the platform 26.

The inclined support 28 carries a plurality of spaced elongated knife blades 35 the lower ends of which are connected to a crossrod 36 which extends through a transverse groove 38 on the lower side of the inclined support. The upper ends of the blades 35 are carried by a crosshead 40 that is supported on its opposite ends by a pair of upright plates 42. The upper ends of the blades 35 are connected by crosspins 44 to corresponding tension rods 45 that carry adjustable nuts 46, the tension rods being maintained under tension by means of coil springs 48 that act in compression between the nuts 46 and the crosshead 40.

Slidingly mounted on the inclined support 28 by means of a pair of guide grooves 50 is a carriage 52 that is adapted to advance the successive pieces of fruit against the plurality of knives 35 to cause the fruit to be sliced. The carriage 52 is reciprocated by a piston rod 54 of an air cylinder 55 and comprises a plurality of parallel plates 56 which, as indicated in FIG. 3, are aligned with the spaces between the knife blades 35, a pair of the parallel plates straddling each of the blades. The leading edges of the parallel plates 56 are cut away to form arcuate recesses 58 with the successive recesses conforming in general to the configuration of a fruit F as indicated in FIG. 3.

The carriage 52 is normally at its lower limit position as shown in FIG. 2, but may be caused to advance by operation of a pair of normally closed control valves 60 which have operating knobs 62. Both hands of the operator are required to operate the two valves 60 simultaneously for a slicing operation.

Figure 5:
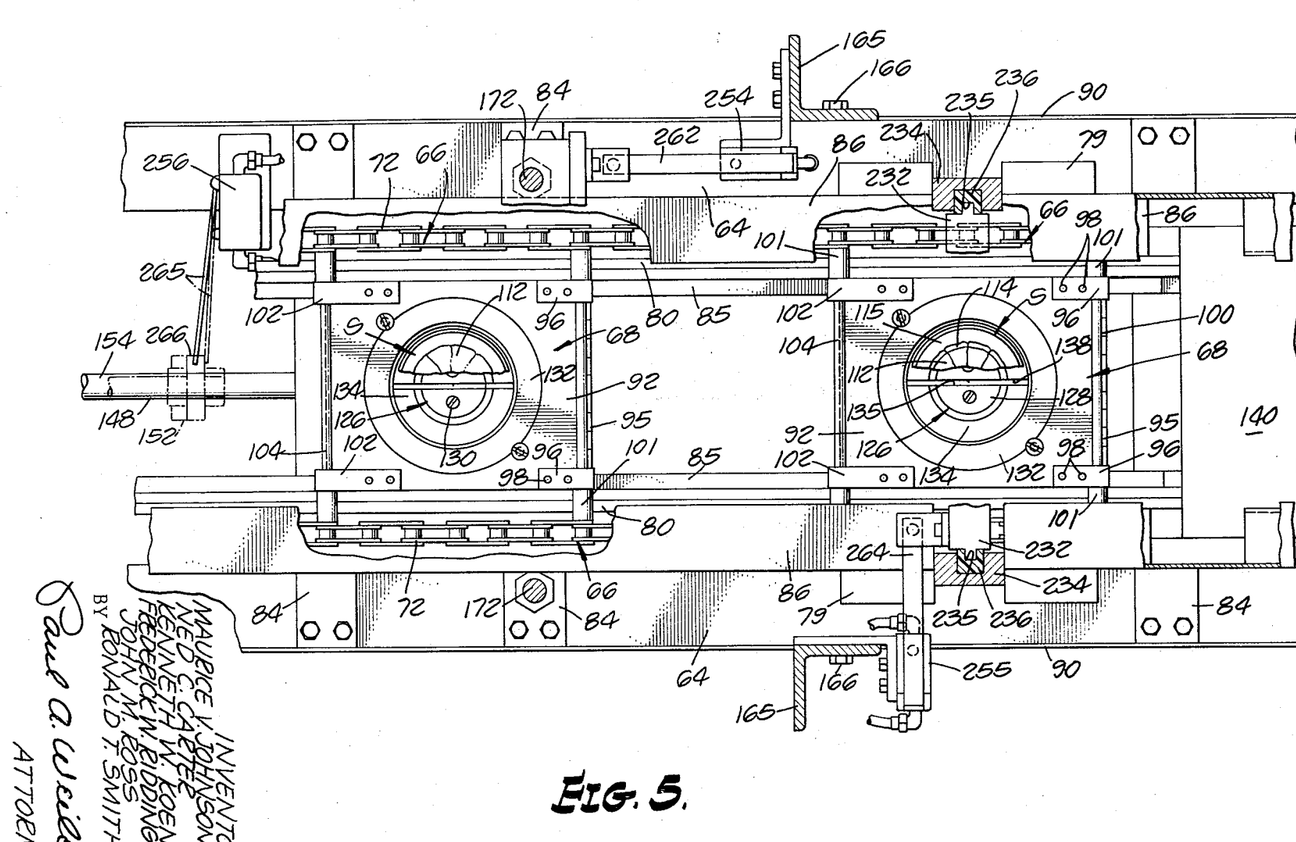
FIG. 5 is a greatly enlarged section taken along the line 5—5 of FIG. 4 showing the construction of the travelling holders that carry the succession of fruit slices.
Figure 6:
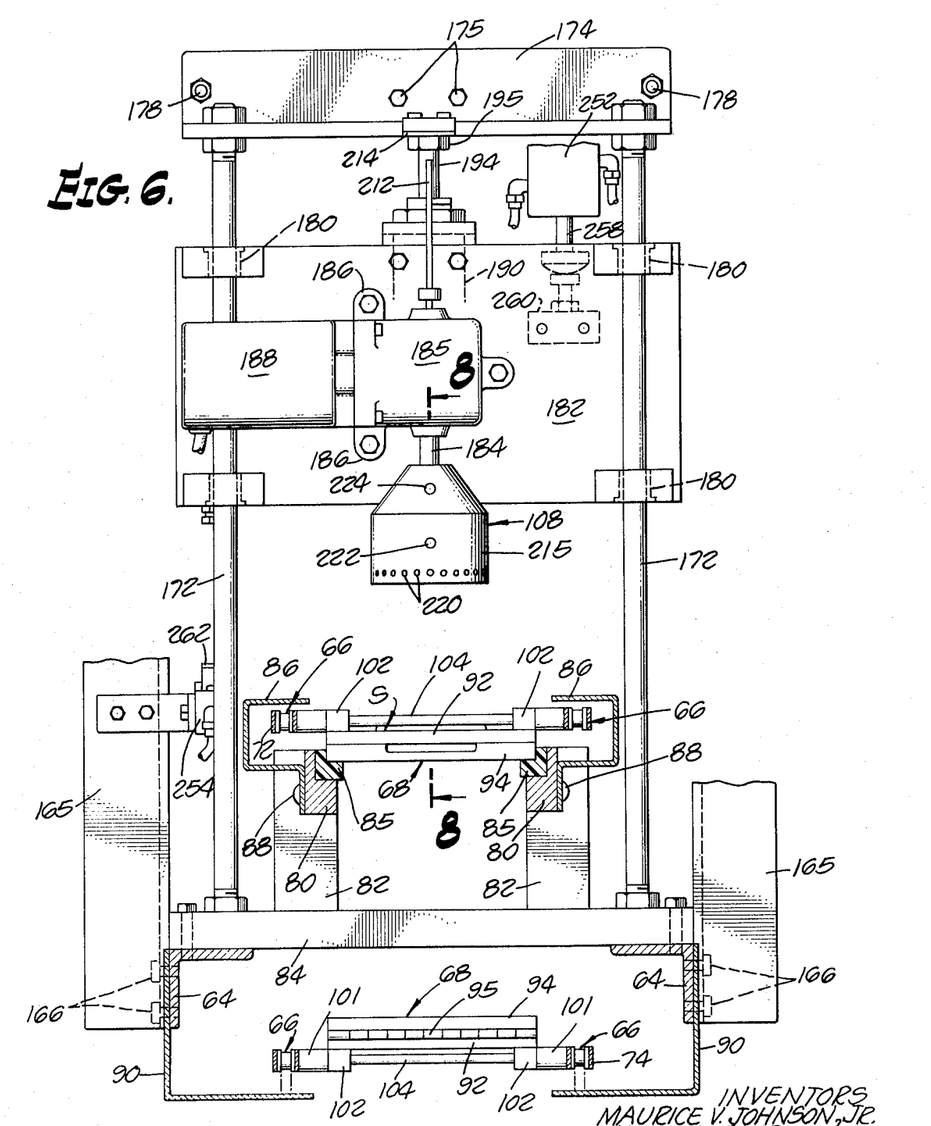
FIG. 6 is a vertical transverse section taken as indicated on line 6—6 of FIG. 4 to show the structure that reciprocates the circular knife at the first cutting station.

The apparatus shown in FIGS. 1 and 2 for processing the fruit slices is built on a pair of spaced longitudinal angle irons 64 which are best shown in FIGS. 5 and 6 and which are supported at their opposite ends by brackets 65 (FIG. 1) on the upper side of the previously mentioned framework 24. The apparatus incorporates a pair of conveyor chains 66 as shown in FIG. 5 which carry a series of holders 68 that receive the successive fruit slices. As indicated in FIG. 1, the two conveyor chains 66 which are of the sprocket type pass around idler sprockets 70 at the opposite ends of the apparatus which form the two chains into upper runs 72 and lower runs 74. Sheet metal housings 75 enclose the idler sprockets at the opposite ends respectively of the apparatus and the housing at the receiving end of the apparatus may serve as a platform for successive receptacles 76 that hold fruit slices that have been produced by the slicing machine 22.

Figure 7:
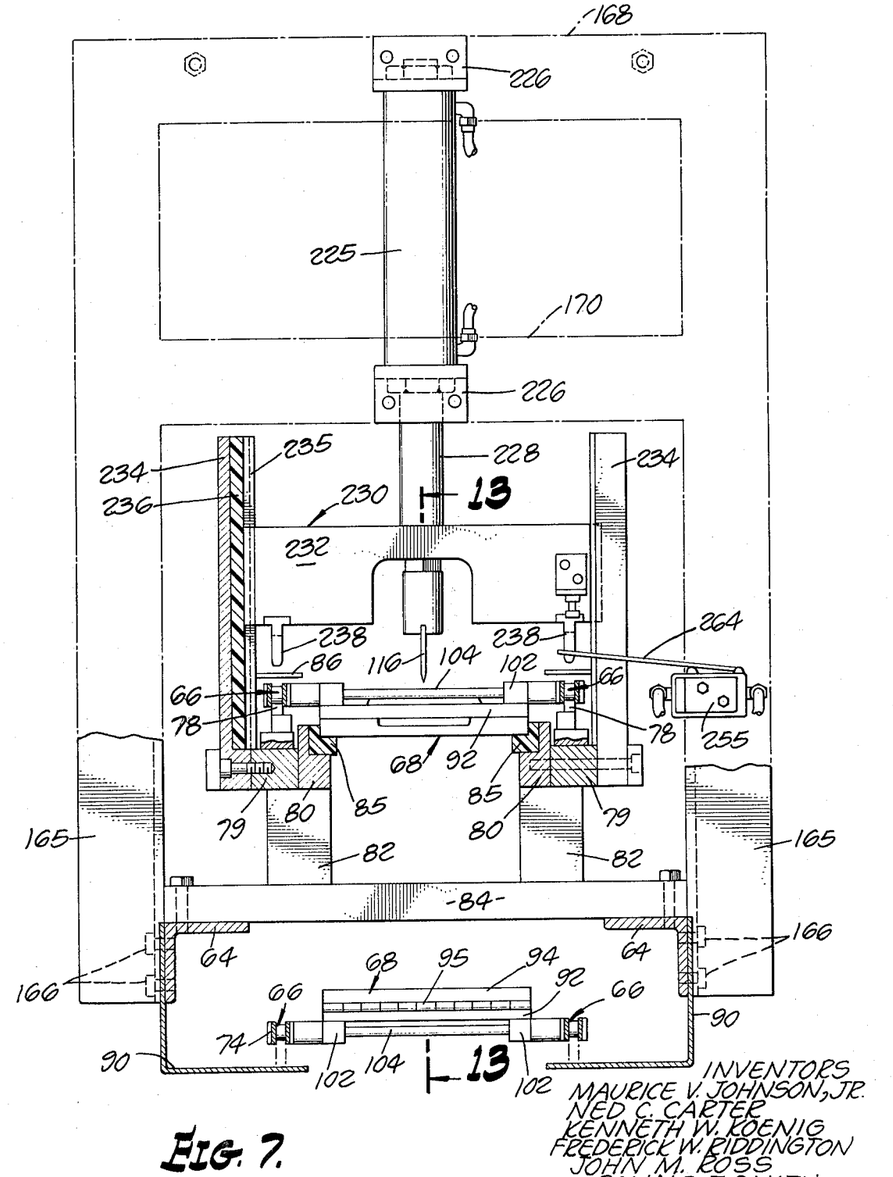
FIG. 7 is a similar view along the angular line 7—7 of FIG. 4 showing the structure of the second cutting station where the central fruit portions are bisected.

As shown in FIG. 7, the upper runs of the two sprocket chains 66 travel along fixed rails 78. A pair of longitudinal beams 80 are carried by spaced posts 82 which, in turn, are mounted on crossbeams 84 that rest on the two longitudinal angle irons 64. The pair of longitudinal beams 80 carry a pair of nylon tracks 85 which cooperate with the holders 68 in a manner to be described hereinafter.

Figures 14, 15:
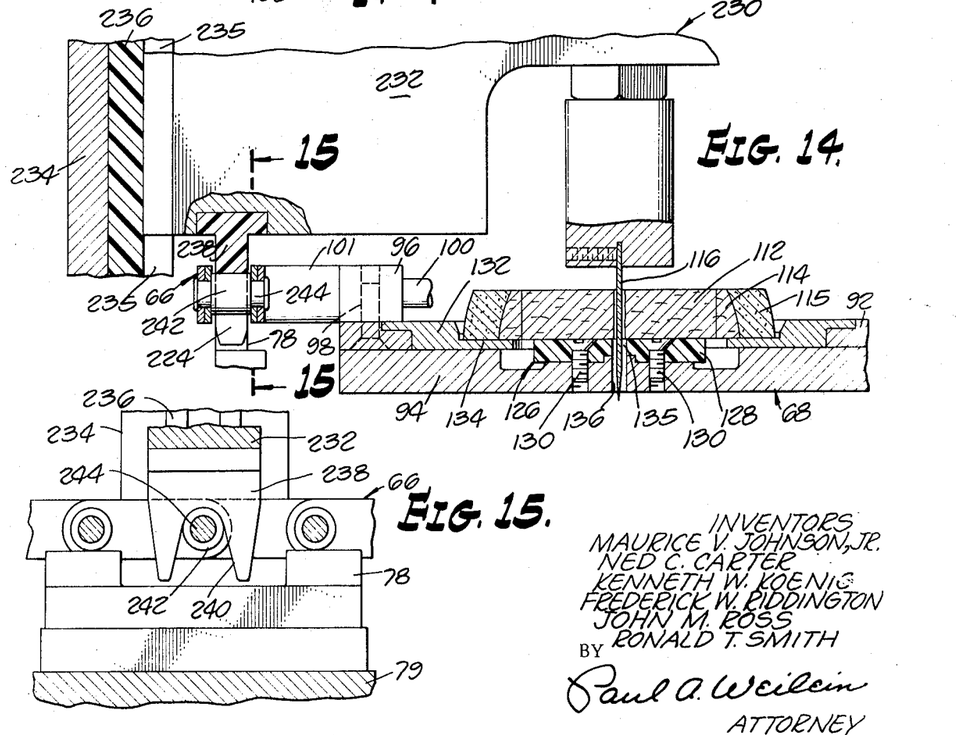
FIG. 14 is a section taken along the line 14—14 of FIG. 13.
FIG. 15 is a section along the line 15—15 of FIG. 14 showing an indexing member in engagement with a conveyor chain.

As shown in FIGS. 5, 7, and 15, small saddles 78 are mounted on U-shaped blocks 79 which, in turn are supported by the longitudinal beams 80. As will be described, the small saddles support the two sprocket chains 66 locally where indexing means engages the chains at one of the operating stations.

As best shown in FIG. 6, a pair of longitudinal sheet metal guards 86 overhang the upper runs of the sprocket chains 66 and are attached to the corresponding longitudinal beams 80 by suitable screws 88. In like manner, the lower runs of the two sprocket chains 66 are protected by sheet metal guards 90 of angular cross section that are attached to the two longitudinal angle irons 64 respectively.

Figure 4:
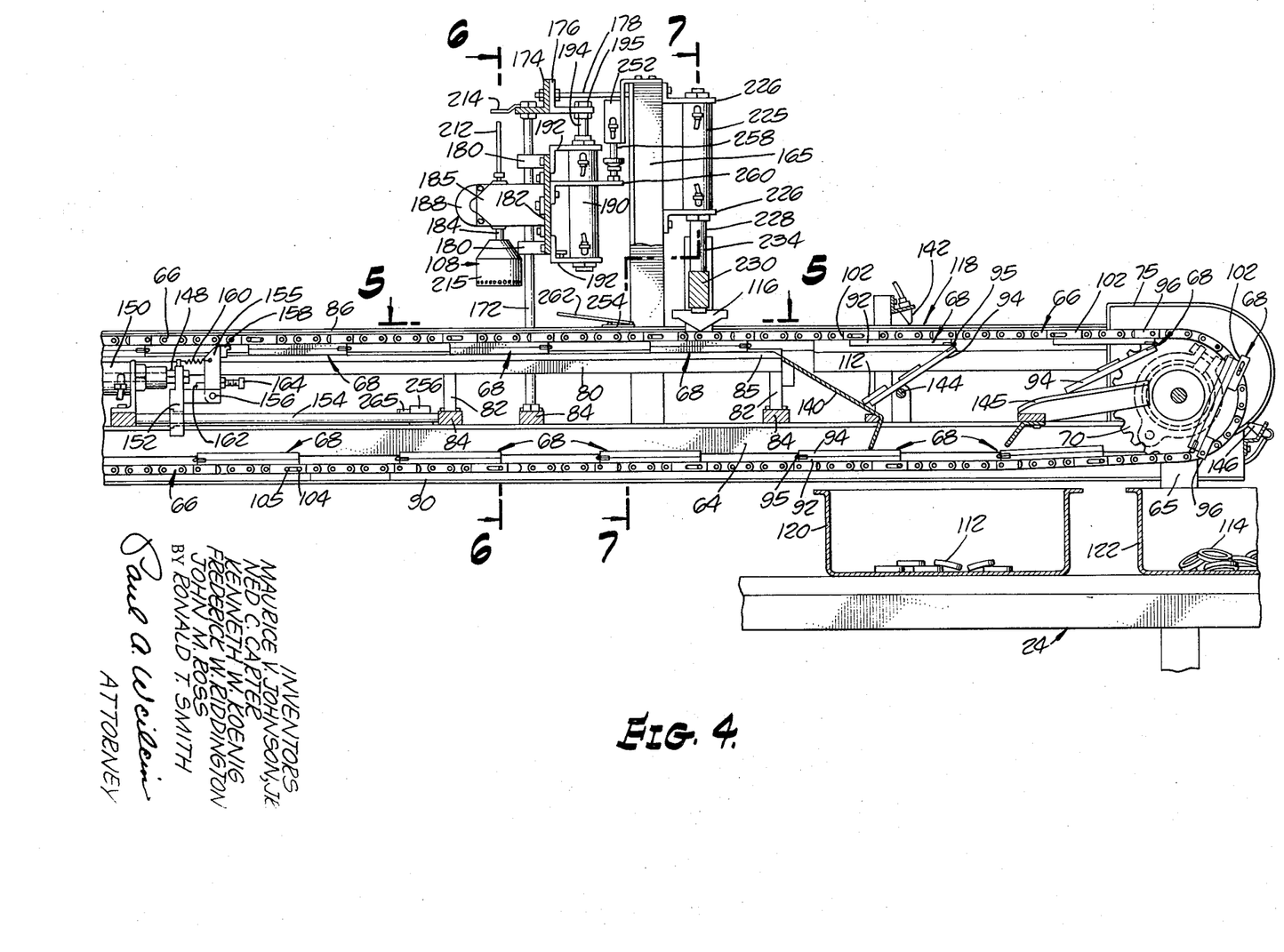
FIG. 4 is an enlarged side elevational view of the apparatus for processing the fruit slices, the view being partly in section.
Figure 8:
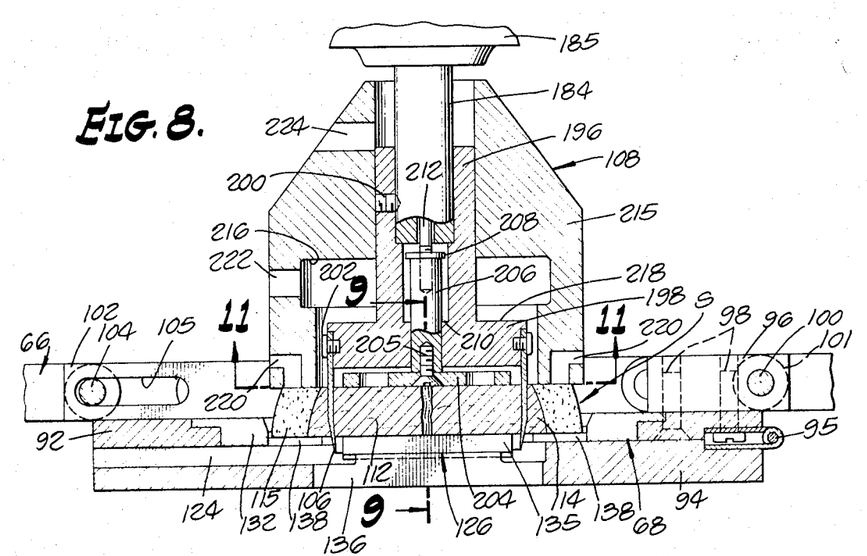
FIG. 8 is an enlarged fragmentary section taken as indicated on line 8—8 of FIG. 6 showing the structure associated with the circular knife.
Figure 9:
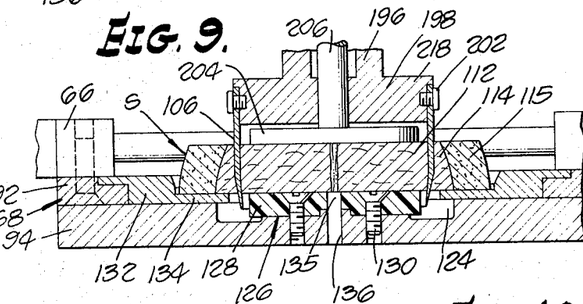
FIG. 9 is a fragmentary section taken as indicated on line 9—9 of FIG. 8.

As shown in FIGS. 4, 8, and 9, each of the holders 68 that is carried by the pair of sprocket chains 66 comprises an upper plate 92 that is attached to the two sprocket chains and a lower plate 94 that is pivotally connected to the upper plate by a transverse hinge 95. The leading end of each upper plate 92 has a pair of spaced bearings 96 attached thereto by screws 98 and the pair of bearings embrace a crossrod 100 the opposite ends of which function as pins in the two sprocket chains respectively. Spacer sleeves 101 on the crossrod 100 center the holder 68 relative to the two sprocket chains. In like manner the trailing edge of the upper plate 92 is provided with a pair of bearings 102 which embrace crossrod 104, the opposite ends of which extend into corresponding slots 105 in the two sprocket chains. The purpose of the slots 105 is to permit relative movement between the trailing ends of the plates 92 and the sprocket chains as required for the sprocket chains to carry the plates around the sprockets 70 at the opposite ends of the apparatus.

The two conveyor chains 66 are advanced intermittently to advance the series of support means 68 through a succession of stations with a pause at each station. At a first cutting station a cylindrical knife 106 (FIG. 8) of a cutter assembly 108 operates on a fruit slice S to sever therefrom a central fruit section 112 to leave a surrounding ring-shaped fruit section 114 which carries a peripheral portion 115 of the skin of the fruit.

Referring to FIGS. 4 and 7, a knife blade 116 at a second cutting station bisects the central fruit sections 112 and at a third station, generally designated 118 in FIG. 4, the severed central fruit sections 112 are dropped into a receptacle 120. Finally, at a fourth station the ring-shaped fruit sections 114 are discharged into a receptacle 122.

Referring to FIGS. 5, 8, and 9, the lower plate 94 of each of the holders 68 for the slices of fruit is formed on its upper side with a recess 124 which extends to the free end of the plate and is dimensioned to serve as a guide for the central fruit sections 112 when they are released by downward swinging movement of the plate at the third station 118. The forward end of each recess 124 is curved as indicated at 125 in FIG. 10, the curvature being concentric to the cylindrical knife 106.

Figure 10:
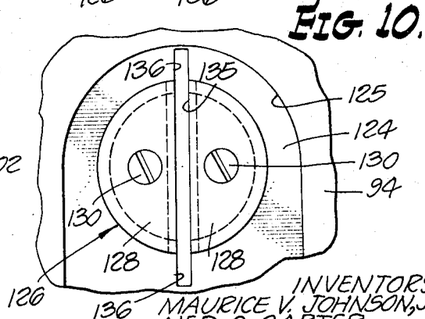
FIG. 10 is a fragmentary plan view showing a portion of one of the holders that carry the fruit slices through the series of stations.
Figure 11:
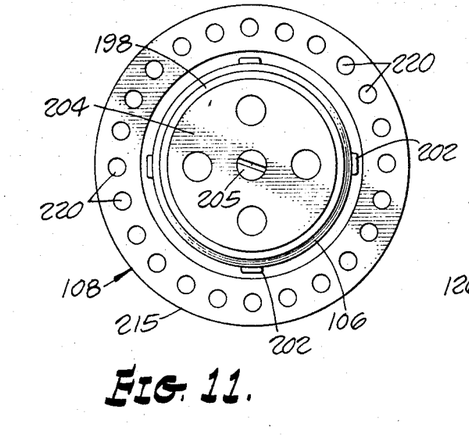
FIG. 11 is a bottom plan view of the circular knife assembly as seen along the line 11—11 of FIG. 8.

Mounted in the forward end of the recess 124 is what may be termed an inner support, generally designated 126, to support the central fruit sections 112 that are severed by the cylindrical knife 106. The inner support 126 comprises a pair of semicircular plastic plates 128 that are secured to the lower plate 94 by suitable screws 130.

Referring to FIGS. 5 and 8, the upper plate 92 of each of the holders 68 has a ring-shaped insert 132 of stepped cross-sectional configuration which may be termed an outer annular support since it forms an annular ledge 134 to support the outer ring-shaped fruit sections 114. Thus, the inner support 126 cooperates with the surrounding outer annular support 132 to support a fruit slice S before and during the cutting operation at the first cutting station, but thereafter the inner support 126 is the sole support for the central fruit sections 112 and the outer annular support 132 is the sole support for the ring-shaped sections 114.

It is to be noted that the inner support 126 and the surrounding outer annular support 132 provide an annular clearance space through which the cylindrical knife 106 may extend into the plane of the recess 124 of the lower plate 94. It is to be noted that the two plastic plates of the inner support 126 are spaced apart to form a diametrical slot 135 which is continued as a lower longer slot 136 in the lower plate 94. These slots 135 and 136 and corresponding radial slots 138 in the ledge 134 of the outer annular support 132 provide clearance for the straight blade 116 at the second cutting station where the central fruit sections 112 are bisected.

Figure 16:
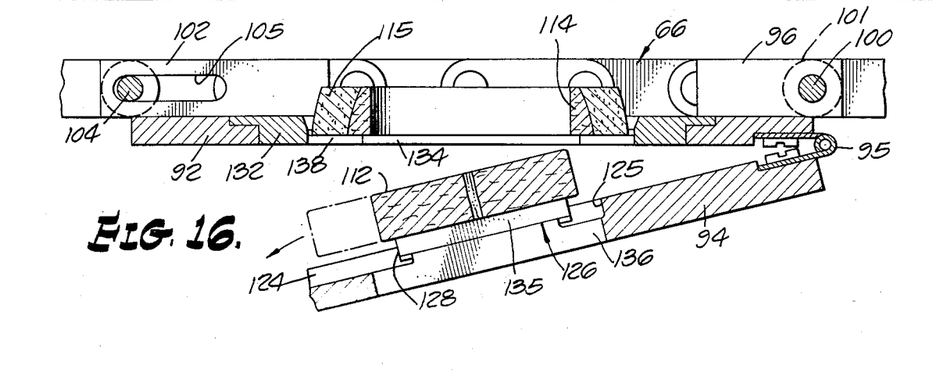
FIG. 16 is an enlarged sectional view of one of the holders on the conveyor chain, the view showing the inner support of the holder swinging downward to release a bisected central fruit portion therefrom.

The purpose of the previously mentioned nylon tracks 85 which are shown in cross section in FIGS. 6 and 7 is to maintain the lower plates 94 of the travelling holders 68 in their upper effective horizontal positions until the lower plates reach the station 118 in FIG. 4. At station 118, the two nylon tracks terminate to permit the lower plates 94 to swing downward by gravity, as shown in FIG. 16, for discharging the central fruit sections 112. When the trailing ends of the lower plates 94 clear the nylon tracks 85, they drop onto a downwardly sloping ramp 140 which permit the lower plates to swing downwardly progressively. In the meantime, a nozzle 142 provides a jet of compressed air which tends to sweep the central fruit sections off of the downwardly inclined lower plates 94 onto the ramp 140.

A transverse crossbar 144 is positioned in the path of the downwardly inclined lower plates 94 to swing the lower plates upward as they reach the lower end of the ramp 40 and then when the lower plates clear the crossbar 144 the lower plates 194 again swing downwardly and make impact with the lower end of an upwardly inclined rail 145. The second downward swing of a lower plate 94 together with the impact of the lower plate against the rail 145 serves to dislodge any clinging central fruit section 112. This arrangement insures that the central fruit sections 112 are released to fall into the receptacle 120. The upwardly inclined rail 145 serves to swing the lower plates 94 upward as the lower plates approach the sprockets 170 at the end of the apparatus.

As the holders 68 successively pass from the upper runs to the lower runs of the two conveyor chains, the holders 68 turn upside down to release the ring-shaped fruit sections 114 from the outer annular supports 132 into the receptacles 122, the discharge of the ring-shaped fruit sections being facilitated by a nozzle 146 that directs a blast of air against the upper plates of the holders. As the holders 68 traverse the lower runs of the sprocket chains 66 in upside down positions, the hinged lower plates 94 rest on the reversed upper plates 92.

Any suitable means may be employed to advance the two conveyor chains 66 step by step to carry the holders 68 from station to station. In this particular embodiment of the invention a piston rod 148 of an air cylinder 150 (FIGS. 1 and 4) reciprocates a slide 152 on a guide rod 154 and a pawl 155 that is pivotally mounted on the slide by a bolt 156 serves to engage the rear edges of the successive holders 68 to advance the holders by increments that are equal to the distance between stations. The pawl 155 carries a transverse bar 158 to abut the rear edges of the successive holders 68 and the pawl in its normal upright position is urged rearwardly by a spring 160 into abutment with a stop 162. Thus, when the slide 152 moves forward, the pawl 155 is upright to engage a holder 68, but when the slide 152 is retracted by the piston rod 148 the pawl 155 is free to swing forward and drag across the under sides of the holders 68. A set screw 164 extending forwardly from the pawl 155 cooperates with the guide rod 154 to serve as stop means to keep the pawl from swinging downward past center with respect to the spring 160 and the pivot bolt 156.

An upwardly extending framework to support the cutting mechanisms at the two cutting stations includes a pair of angle iron legs 165, best shown in FIG. 7, which are attached to the longitudinal angle irons 64 by suitable screws 166. The two legs are interconnected by an upper crossbar 168 and an intermediate crossbar 170. As shown in FIGS. 4 and 6, the upwardly extending framework further includes a pair of rods 172 that extend upward from one of the previously mentioned crossbeams 84 with the upper ends of the two rods interconnected by a transverse angle iron 174. The transverse angle iron 174 is connected by screws 175 to a second transverse angle iron 176 and the two angle irons 174 and 176 are connected to the previously mentioned upper crossbar 168 by a pair of tie rods 178.

Slidingly mounted on the two upright rods 72 by means of slide bearings 180 is a carriage in the form of a plate 182 that carries the previously mentioned cutter assembly 108 at the first cutting station. As shown in FIG. 6 a tubular drive shaft 184 of the cutter assembly 108 extends downwardly from a gear box 185 that is mounted on the plate 182 by ears 186 and a motor 188 for continuously rotating the cylindrical knife 106 of the cutter assembly is supported by the gear box. As shown in FIG. 4 an air cylinder 190 is mounted on the back of the plate 182 by a pair of brackets 192 and a piston rod 194 that extends upwardly from the air cylinder is connected to the previously mentioned transverse angle iron 176 by a pair of nuts 195 to advance and retract the cutter assembly 108 relative to the successive holders 68.

As best shown in FIG. 8, a tubular shank 196 of a circular cutter head 198 is secured to the tubular drive shaft 184 by a set screw 200 and the previously mentioned cylindrical knife 106 is mounted on the cutter head by suitable screws 202. Inside the cylindrical knife 106 a perforated ejector disc 204 is mounted by a screw 205 on the lower end of a stem 206 that is slidable in the cutter head 198. The stem 206 is formed with a radial flange 208 to cooperate with an inner annular shoulder 210 of the cutter head to limit the downward movement of the ejector disc relative to the cutter head. Fixedly connected to the upper end of the stem 206 is a rod 212 which, as shown in FIG. 4, extends upwardly from the gear box 185 to cooperate with a fixed overhead stop 214.

The cutter head 198 is surrounded by a hollow weight 215 that slides on the tubular shank 196 of the cutter head, the downward movement of the hollow weight relative to the cutter head being limited by contact of an inner shoulder 216 of the weight against the upper surface 218 of the cutter head. The hollow weight 215 acts on the outer ring-shaped fruit sections 114 and the lower leading edge of the hollow weight is formed with a series of angular bores 220 to prevent any suction effect from occurring between the hollow weight and the ring-shaped fruit sections. In addition, the hollow weight 215 has radial bores 222 and 224 to permit free flow of air into and out of the hollow weight. When the cutter assembly 108 is elevated with the hollow weight 215 supported by the cutter head 198, the hollow weight rotates with the cutter head, but when the weight of the hollow weight is transferred to the fruit slices by the lowering of the cutter assembly, frictional rotation of the hollow weight by the cutter head ceases.

Figure 12:
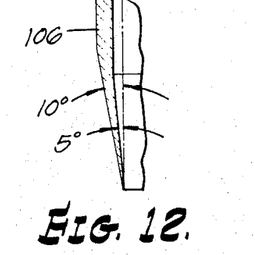
FIG. 12 is an enlarged radial section of the circular knife.
Figure 13:
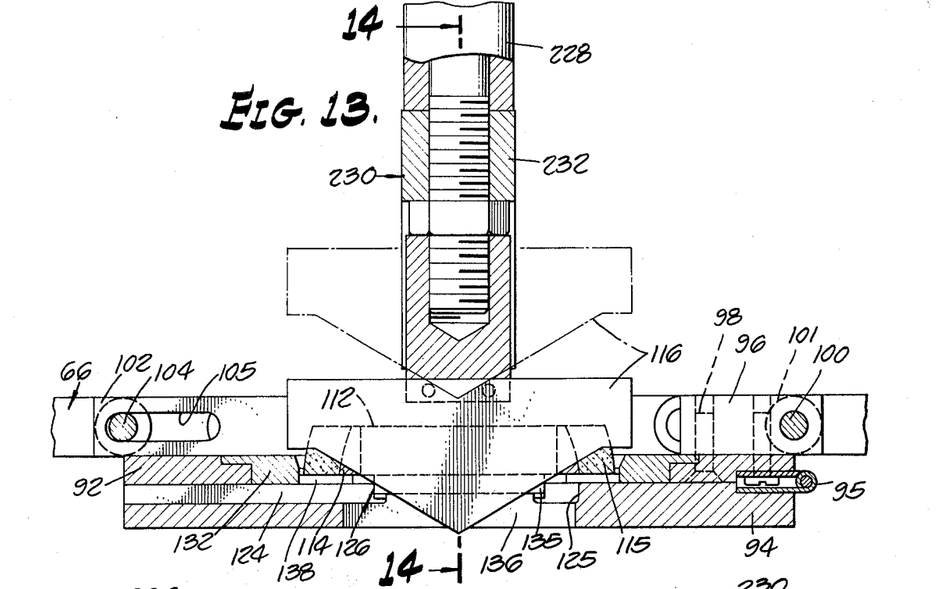
FIG. 13 is a greatly enlarged section along the line 13—13 of FIG. 7 showing the bisecting blade at its lower limit position.

A feature of the invention is that the cylindrical knife 106 is of the shape shown in cross section in FIG. 12 to promote separation of the central fruit sections 112 from the surrounding ring-shaped fruit section 114. It can be seen that the outer circumferential surface of the cylindrical blade tapers towards the cutting edge at an angle of 10° relative to the axis of the cylindrical blade and that the inner circumferentia' surface tapers at an angle of 5° relative to the axis. Thus, the diameter of the cutting edge itself is appreciably less than the diameter of the rest of the cylindrical blade. The affect of this configuration is that the advancing cylindrical blade acts against the inner circumferential surface of a ring-shaped fruit section 114 to expand the ring-shaped fruit section away from the central fruit section 112. The expansion of the ring-shaped fruit section minimizes any tendency for the two fruit sections to adhere to each other and thus insures that the central fruit section 112 drops freely from the surrounding ring-shaped fruit section when the inner support 126 of a holder 68 swings downward at the station 118.

The structure at the second cutting station where the central fruit sections 112 are bisected is shown in FIGS. 4, 7, 13, and 14. As shown in FIGS. 4 and 7, an air cylinder 225 is mounted by brackets 226 on the previously mentioned cross-bars 168 and 170 of the upright frame structure and a piston rod 228 extending downward from the air cylinder carries the previously mentioned straight cutting blade 116 and also carries a crosshead 230 in the form of a plate 232 that cooperates with a pair of upright guides 234. In the construction shown, the opposite edges of the plate 232 slidingly engage grooves 235 of a pair of nylon tracks 236 that are supported by the previously mentioned U-shaped blocks 79.

The lower edge of the crosshead 230 carries a pair of index members 238 that are of forked construction as shown in FIG. 15 to engage transverse elements of the two conveyor chains 66, respectively. As may be seen in FIG. 15, each of index members 238 is formed with a tapered notch 240 to straddle a sleeve 242 of a cross-pin 244 of a conveyor chain 66 with a centering action to cause the holders 68 for the fruit slices to be accurately positioned at the two cutting stations at each pause in the intermittent advance of the holders. The previously mentioned small saddles 78 support the two sprocket chains locally during each indexing operation as shown in FIG. 15.

FIG. 14 shows how the blade 116 in bisecting a central fruit section 114 enters the previously mentioned slot 135 between the two plastic plates 128 of the inner support 126 and further extends into the slot 136 that is formed in the lower plate 94 of the holder 68.

The manner in which the fruit slices on the successive holders 68 of the chain conveyor are processed may be readily understood from the foregoing description.

When the air cylinder 150 intermittently advances the conveyor, each holder 68 pauses at the two cutter stations in turn. During the pause of a holder 68 at the first cutter station, the cutter assembly 108 lowers to cause the suspended hollow weight 215 to contact a fruit slice on the holder 68 before the circular knife 106 reaches the fruit slice. Thus, the hollow weight 215, in effect, clamps the fruit slice against the holder 68 during the cutting operation by the circular knife 106. The circular knife passes through the fruit slice and on into the circular clearance between the inner support 126 of the holder and the outer annular support 132 of the holder and in doing so not only severs the central fruit section 112 from the ring-shaped section 114, but also slightly expands the inner circumference of the ring-shaped fruit section 114 to minimize any tendency there may be for the two severed fruit sections to cling together. The upward withdrawal of the circular knife 106 leaves the inner fruit section 112 supported solely by the inner support 126 and leaves the ring-shaped fruit section 114 supported solely by the outer annular support 134.

As the cutter assembly 108 retracts upward, the hollow weight 215 lags behind the circular knife 106 to maintain pressure on the ring-shaped fruit section 114 to strip the ring-shaped fruit section from the circular knife if there is any tendency for the ring-shaped fruit section to cling to the circular knife. When the cutter assembly 108 rises a short distance in its upward retraction movement, the annular shoulder 218 of the cutter head 198 contacts the annular shoulder 216 of the hollow weight 215 to cause the hollow weight to follow the remainder of the upward movement of the cutter head.

If the weight of the ejector disc 204 together with the stem 206 and the rod 212 is sufficient to overcome the tendency for the severed central fruit section 112 to cling to the circular knife 106, the ejector disc remains stationary during the initial rise of the circular knife 106 to free the central fruit section from the circular knife and subsequently the inner annular shoulder 210 of the cutter head 198 contacts the flange 208 of the ejector stem 206 to carry the ejector disc upward through the remainder of the upward movement of the cutter assembly 108. On the other hand, if the weight imposed on the central fruit section 112 by the ejector disc 204 is not sufficient to free the central fruit section 112 from the circular knife, the central fruit section initially moves upward with the circular knife but the contact of the upper end of the stem 212 with the overhanging stop 214 interrupts the upward movement of the ejector disc and thus causes the ejector disc to free the inner fruit section from the ascending circular knife.

When the holder 68 with the two severed fruit sections 112, 114 thereon advances to the second cutter station and pauses, the straight blade 116 lowers to bisect the inner fruit section 112 and in doing so extends into the slots 135 and 136 as shown in FIG. 14.

At the next advance of the holder 68 when the holder reaches the station 118, the lower plate 94 of the holder swings downward as shown in FIG. 4, and the jet of air from the nozzle 142 urges the two halves of the inner fruit section 112 downward towards the ramp 140 to slide from the ramp into the receptacle 120. If the severed halves of the inner sections 112 cling to the downwardly inclined plate 94, the next advance of the holder 68 first elevates the downwardly inclined plate 94 and then frees the plate to make impact against the leading end of the rail 145 to jar the clinging fruit sections from the lower plate.

The next advance of the holder 68 starts the transition of the holder from its normal horizontal position to its upside down position on the lower run of the two conveyor chains. The holder 68 pauses in the position shown in FIG. 1 to permit the blast of air from the nozzle 146 to act on the ring-shaped fruit section 114 and if the ring-shaped fruit section does not drop away from the holder at this time, it does so on the next advance of the holder as the holder turns completely upside down over the receptacle 122.

Any suitable control system may be provided for carrying out the described cycles of operation automatically. Preferably, a completely pneumatic control system shown diagrammatically in FIG. 17 is employed for this purpose.

Figure 17:
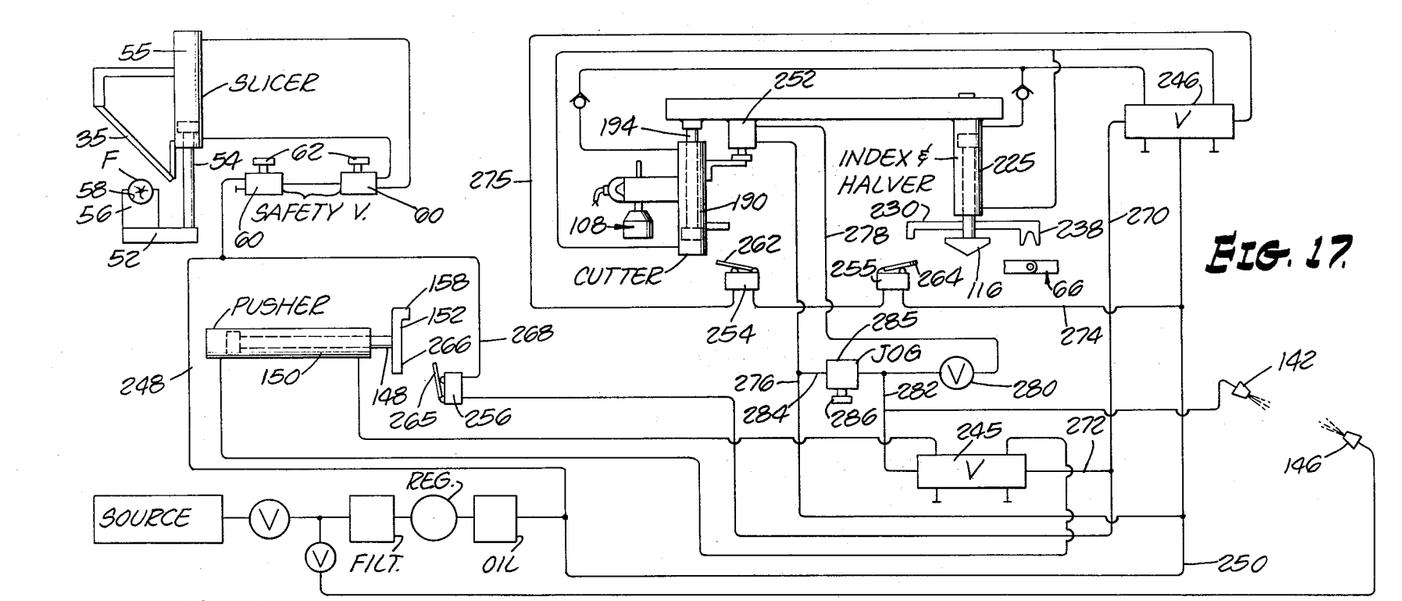
FIG. 17 is a diagram of the pneumatic control system.

In FIG. 17 a four-way valve 245 controls the air cylinder 150 that intermittently advances the conveyor chains and a second similar four-way valve 246 controls the two air cylinders 190 and 225 at the two cutter stations respectively. Each of these two four-way valves is of the spool type in which a spool is normally centered by spring means (not shown) in a well known manner. Each of the two valve spools may be shifted in one direction from its normal central position by compressed air admitted at one end of the four-way valve and may be shifted out of its normal central position in the opposite direction by compressed air admitted to the other end of the four-way valve.

In FIG. 17 a high pressure air line 248 actuates the air cylinders 55 of the slicing machine 22 through the two previously described manually operable valves 60 and a second high pressure line 250 is connected to the center ports of the two four-way valves 246. Operation of the two four-way valves 245 and 246 is controlled by four normally closed air valves which are shown diagrammatically in FIG. 17, namely: a first air valve 252 which is opened by upward retraction of the cutter assembly 108; a second air valve 254 which is opened by the downward advance of the cutter assembly 108; a third air valve 255 which is in series with air valve 254 and is opened by the downward advance of the straight blade 116 at the second cutter station; and a fourth air valve 256 which is opened by the advance of the conveyor chains by the air cylinder 150.

As shown in FIG. 4 the normally closed air valve 252 has an operating plunger 258 which is actuated by a bracket 260 that moves upward with the cutter assembly 108. FIG. 4 also shows how an operating arm 262 of the normally closed air valve 254 extends into the path of downward movement of the structure that travels with the cutter assembly 108. FIG. 7 shows how an operating arm 264 of the normally closed air valve 255 extends into the path of downward movement of the crosshead 230 at the second cutter station. FIG. 5 shows how an operating arm 265 of the normally closed air valve 256 extends into the path of advance of a collar 266 on the piston rod 148 of the air cylinder 150.

In FIG. 17 the high pressure line 248 is connected to one side of the air valve 256 by a branch line 268 and the second side of the air valve 256 is connected to the left end of the four-way valve 246 by a line 270 and is also connected to the right end of the four-way valve 245 by a branch line 272. A branch line 274 from the high pressure line 250 is connected to the two air valves 254, 255 which are in series and the two air valves are connected, in turn, by a line 275 to the right end of the four-way valve 246. The high pressure line 250 is connected by a line 276 to one side of the air valve 252 and the second side of the air valve is connected by a line 278 to one side of a normally open manually operable valve 280. The second side of the valve 280 is connected by a line 282 to the left end of the four-way valve 245.

A by-pass line 84 interconnecting the two lines 276 and 282 is controlled by a normally closed air valve 285 that may be manually opened by depressing a plunger 286. For automatic operation of the apparatus, the manually operable valve 280 is open. Closing the valve 280 places the system under the control of the manual valve 285 which may be termed a jog valve since momentary depression of the plunger 286 causes an increment of advance of all of the working parts of the apparatus.

It is apparent that complete advance of the cutter assembly 108 at the first cutter station opens the air valve 254 and complete advance of knife 116 at the second cutter station opens the normally closed air valve 255 and the two valves 254 and 255 function in series to supply air pressure to the right end of the four-way valve 246 through the line 275 to shift the spool thereof leftward and thereby cause the four-way valve to retract upward the cutter assembly 108 at the first cutter station and the straight blade 116 at the second cutter station. The upward retraction of the cutter assembly 108 at the first cutter station opens the normally closed air valve 252 to shift the spool in the four-way valve 245 to the right thereby to cause the four-way valve 245 to actuate the air cylinder 150 to advance the conveyor chains by one increment.

The advance of the piston rod 148 of the air cylinder 150 to advance the conveyor chains opens the air valve 256 and one result is to supply pressure to the left end of the four-way valve 246 to shift the spool therein rightward to cause the four-way valve to energize the two air cylinders 190 and 225, respectively, for downward advance of the cutter assembly 108 at the first cutter station and the downward advance of the straight blade 116 at the second cutter station. A second result of opening the air valve 256 is to supply air pressure to the right end of four-way valve 245 to shift its spool to the left to cause retraction of the piston rod 148 of the cylinder 150 that advances the conveyor.

The detailed description of the presently preferred embodiment of the invention will suggest various changes, substitutions and other departures from the disclosure within the spirit and scope of the appended claims.

What is claimed is:

1. In an apparatus of the character described to process fruit slices having peripheral skin portions, the combination of:
   conveyor means moving past a series of stations including a cutting station;
   a series of spaced holders on the conveyor means to receive the fruit slices successively;
   means to advance the conveyor means step by step to cause each of said holders to pause at the successive stations,
   each of said holders comprising an inner support of less area than a fruit slice and a surrounding outer annular support;

a knife of generally circular configuration at said cutting station to sever central fruit sections from the fruit slices on the holders and to release the central fruit sections to the inner supports of the holders, leaving surrounding ring-shaped fruit sections on the outer supports of the holders;

means to reciprocate the circular knife downward for cutting action on the fruit slices;

means to discharge the central fruit sections from the inner supports; and means to discharge the ring-shaped sections from the outer supports.

2. A combination as set forth in claim 1 which includes means to rotate said circular knife concentrically to facilitate the severance of the central fruit section from the fruit slice.

3. A combination as set forth in claim 1 which includes a straight blade at one of said stations to cut the central fruit sections into at least two parts.

4. A combination as set forth in claim 3 in which said blade is a straight blade to bisect the central fruit section;

and in which the inner support of each holder has a diametrical recess to receive the straight blade.

5. A combination as set forth in claim 3 in which the circular knife and the straight blade are at two successive stations and are interconnected to operate in unison.

6. A combination as set forth in claim 5 which includes means unitary with the circular knife and the straight blade to index the conveyor.

7. A combination as set forth in claim 1 which includes an ejector within the area defined by the circular knife for movement relative to the knife to disengage the severed central fruit sections from the knife.

8. A combination as set forth in claim 7 which includes means at the cutting station to advance the circular knife and ejector simultaneously towards the fruit slices to cut the fruit slices and to retract the circular knife and ejector after each cutting operation with the extent of retraction of the circular knife exceeding the extent of retraction of the ejector to cause the ejector to disengage the central fruit sections from the circular knife.

9. A combination as set forth in claim 1 which includes means outside the circular knife to hold said outer fruit sections on the outer supports when the circular knife retracts.

10. A combination as set forth in claim 9 in which the circular knife is part of a reciprocative cutter assembly;

and in which said means to hold the outer fruit sections on the outer supports comprises a weight suspended from the cutter assembly to contact the fruit slices in advance of the circular knife with freedom for the weight to retract relative to the circular knife as the circular knife advances.

11. A combination as set forth in claim 10 in which the reciprocative cutter assembly includes upright tubular means with the circular knife mounted thereon, said tubular means having an outer upwardly facing shoulder;

in which said weight surrounds the tubular means and normally rests on said outer shoulder in a retractable manner to contact the fruit slice in advance of the circular knife;

in which an ejector is positioned inside the circular knife, and which includes a fixed stop cooperative with the ejector to limit the upward movement of the ejector thereby to cause the ejector to disengage a severed central fruit portion from the circular knife as the circular knife retracts upward.

12. A combination as set forth in claim 1 in which the inner and outer supports of each of said holders form an annular gap to receive the leading edge of the circular knife.

13. A combination as set forth in claim 1 in which the inner support of each of the holders is pivotally connected to the corresponding outer support to swing downward from its normal position;

and which includes fixed means extending longitudinally of the conveyor means to keep the inner support of each holder at its normal position until the inner support reaches the particular station for discharge of the central fruit sections.

14. A combination as set forth in claim 13 which includes means to create a jet of air to facilitate removal of the central fruit sections when the inner supports swing downward.

15. A combination as set forth in claim 1 in which said series of holders are mounted on continuous flexible means having an upper run and a lower run, the fruit slices being received on the holders when the holders are on said upper run;

and in which the ring-shaped fruit sections are discharged by the holders turning upside down as the holders pass from the upper run to the lower run of the continuous flexible means.

16. A combination as set forth in claim 15 which includes means to create a jet of air to facilitate the removal of the ring-shaped fruit sections from the holders when the holders pass from the upper run to the lower run.

17. A combination as set forth in claim 1 which includes slicing means to cut the fruit slices from fruit to supply fruit slices for the successive holders, said slicing means comprising:

a bank of knives positioned side by side and spaced apart by the thickness desired for the fruit slices;

a bank of members aligned with the spaces between the knives and having their leading edges cut away to form a seat for the successive fruit; and means to advance one of said banks relative to the other until the two banks overlap sufficiently to shear the fruit into the desired slices.

18. A combination as set forth in claim 17 in which the knives of the bank of knives are spring-tensioned blades positioned diagonally of the direction of longitudinal relative movement between the two banks.

19. A combination as set forth in claim 1 in which said series of holders are mounted in a row along a freely movable endless chain means of said conveyor means;

and which includes indexing means movable laterally of the chain means into engagement therewith during the pauses to position the holders with precision at said stations.

20. A combination as set forth in claim 1
in which said conveyor means includes a continuous flexible means having an upper run and a lower run;
in which the flexible means is actuated intermittently to advance the holders from station to station;
in which the holders are right side up when on the upper run and are upside down when on the lower run;
in which said outer supports are attached to the flexible means to move therewith so that the outer supports turn upside down to discharge the ring-shaped fruit sections therefrom when the outer supports make the transition from the upper run to the lower run;
in which the inner supports are hingedly mounted to tend to swing downward;
and which includes fixed means extending along said upper run to keep said inner supports from swinging downward until the inner supports reach the station at which the central fruit sections are discharged.

21. A combination as set forth in claim 1
in which the circular knife is progressively reduced in outside diameter towards its lower edge to tend to separate the ring-shaped fruit sections from the central fruit sections.

22. An improvement as set forth in claim 21
in which the circular knife is also progressively reduced in inside diameter towards its lower edge.

23. A combination as set forth in claim 1
which includes a first four-way valve with a first spring-centered spool to control the advances of the conveyor means;
which includes a second four-way valve with a second spring-centered spool to control the advance and retraction of the circular knife;
which includes means to shift the first spool in one direction to advance the conveyor means in response to retraction of the circular knife;
which includes means to shift the first spool in the opposite direction in response to advance of the conveyor means;
which includes means to shift the second spool in one direction to advance the circular knife in response to advance of the conveyor means;
and which includes means to shift the second spool in the opposite direction to retract the circular knife in response to advance of the circular knife.

24. A combination as set forth in claim 23
in which the conveyor means and the circular knife are advanced by fluid pressure under control of the two four-way valves;
and in which the two spools of the two four-way valves are shifted by fluid pressure supplied by control valves,
and in which said control valves include a control valve responsive to advance of the conveyor means, a control valve responsive to advance of the circular knife, and a control valve responsive to retraction of the circular knife.

25. In an apparatus of the character described, means to process fruit slices having peripheral skin, comprising:
a holder to support a fruit slice from below, a central part of the holder being positioned to support a central section of the fruit and a surrounding part of the holder being positioned to support a ring-shaped section of the fruit that surrounds the central section;
a cutter assembly above the holder;
a substantially circular knife included in the assembly and directed downward towards the holder;
means to reciprocate the assembly downward to cause said circular knife to sever said central fruit section from said ring-shaped fruit section with peripheral skin leaving the central fruit section on said central part of the holder and leaving said ring-shaped section on said surrounding part of the holder;
ejector means included in the assembly inside the circular knife to disengage the severed central fruit section from the circular knife to cause the central fruit section to rest on said central part of the holder; and
means included in the assembly outside the area defined by the circular knife to press the severed ring-shaped fruit section against said surrounding part of the holder to disengage the ring-shaped fruit section from the circular knife as the circular knife retracts from the holder.

26. A combination as set forth in claim 25
in which at least one of said parts of the holder are movable relative to the other part of the holder to dispose one of said fruit sections independently of the other fruit section.

27. A combination as set forth in claim 26
in which said inner support is pivotally mounted to swing downward to dislodge the central fruit section therefrom.

28. A combination as set forth in claim 25
in which said cutter assembly includes a support structure with the circular knife attached thereto;
in which said means to disengage the ring-shaped fruit section from the circular knife is a weight separate from the support structure outside the area defined by the circular knife;
and in which said weight is mounted on the support structure with freedom for movement relative thereto between a first lower position projecting downward beyond the circular knife and a second upper position, the weight being gravitationally biased to its first position.

29. A combination as set forth in claim 28
in which the cutter assembly includes a support structure with the circular knife attached thereto;
in which said ejector means is mounted on said support structure with freedom to move relative thereto axially of the circular knife between an upper position inside the circular knife and a lower position in the region of the plane of the cutting edge of the knife;
and which includes means to block upward movement of the ejector means before the support structure reaches the upper limit of its range of reciprocation, thereby to shift the ejector means from its upper relative position to its lower relative position to disengage the central fruit section from the circular knife.

30. A combination as set forth in claim 1, which includes means to advance the conveyor means one step in response to upward retraction of the circular knife at the cutting station;

which includes means to advance the circular knife of the cutting station downward in response to advance of the conveyor means;

and which includes means to retract the circular knife at the cutting stage upward in response to termination of the downward advance of the circular knife.

* * * * *